June 2, 1959 R. O. ENDRES ET AL 2,889,467
SEMICONDUCTOR INTEGRATOR
Filed May 3, 1954
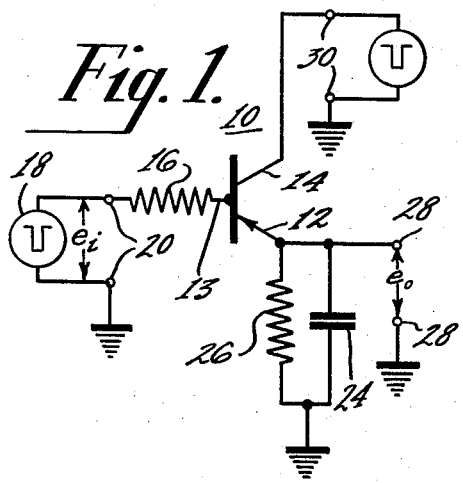
Fig. 1.
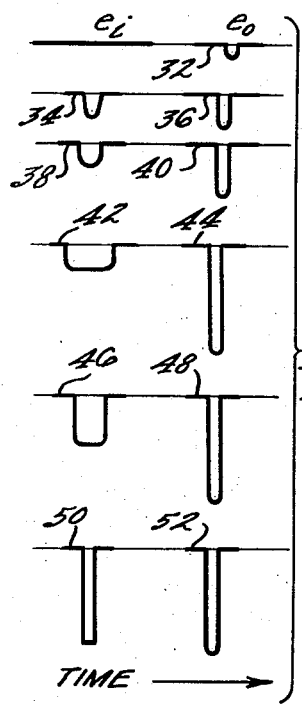
Fig. 2.
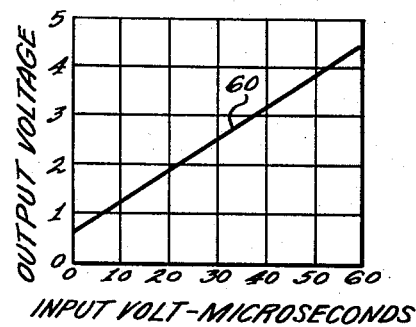
Fig. 3.
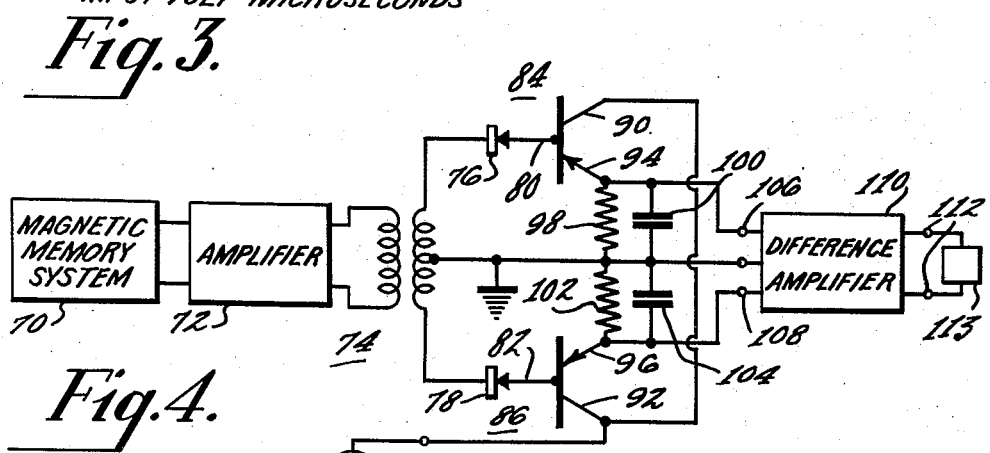
Fig. 4.
INVENTORS
Richard O. Endres &
Don E. Deuitch
BY 
ATTORNEY

United States Patent Office 2,889,467
Patented June 2, 1959

2,889,467

SEMICONDUCTOR INTEGRATOR

Richard O. Endres, Collingswood, and Don E. Deuitch, Haddonfield, N.J., assignors to Radio Corporation of America, a corporation of Delaware Application May 3, 1954, Serial No. 427,164

3 Claims. (Cl. 307—88.5)

This invention relates generally to semiconductor memory circuits and particularly to memory circuits of that type in which integration of fast pulses is provided.

In digital computer circuitry there is often a need for separation of useful electrical information of a pulse character from concurrent noise which may also be in the form of pulses. Discrimination between useful information and noise may be made on the basis of amplitude by means of an amplitude discriminator, on the basis of time by some form of gate circuit, or on the basis of rise time. There are certain cases, however, where none of these methods yield satisfactory discrimination between the pulse information and the noise. For example, if the amplitude of the noise is as great as the amplitude of the information pulse, simple amplitude discrimination fails. Likewise the noise may be strong at the time the signal is strong in which case a gate circuit will not be able to discriminate between the two. The rise time of certain noise pulses may be as great as that of the signal in which case discrimination on the basis of rise time is not possible.

Discrimination based on total energy may succeed where the other methods fail, since the useful information often contains a greater amount of energy than the noise information. Various circuits may be used to sense the total energy in a pulse, all of which utilize integration of voltage or current with respect to time. If the input voltage and current are proportional in such a circuit, the output signal will have an amplitude which is proportional to the energy of the incoming wave.

It is well known that the series resistor and a shunt capacitor may be used to integrate a voltage signal. If an input signal of predetermined frequency is applied across the series combination of the resistor and capacitor, an output voltage which is the integral of the input voltage may be derived across the capacitor. The loss in such a circuit, is quite large, particularly if accurate integration over a wide range of input frequencies is required.

Noise discrimination methods which utilize integration of the input signal are particularly useful in connection with the unambiguous detection of output signals from a magnetic storage or memory. One such system is described in an article entitled "Static Magnetic Matrix Memory and Switching Circuits," by Jan. A. Rajchman in the RCA Review, June 1952, pages 183–201. In this article, a system is described in which pulse information causes each magnetic core in a matrix to assume a direction of magnetization which is indicative of the binary information stored. The address of a given core is determined uniquely by the selection of a proper row and column in the matrix. Only the core which is selected receives enough current to change the direction of magnetization. The other cores in the same row and column will receive less than enough energy to cause a reversal of the direction of magnetization. The flux-magnetization characteristics of these cores will describe minor hysterisis loops.

A sensing wire, which is magnetically coupled in common to all the cores of the matrix, will have induced in it a signal voltage from the selected core. In addition, extraneous voltages will appear due to the partial flux changes in the other cores. The sensing wire is threaded through the cores in such manner that these extraneous signals tend to cancel. Cancellation may not be complete, however, since the flux change in the cores producing the extraneous signals may contribute a varying amount to the output voltage, depending primarily upon whether the incoming current tends to magnetize them further in the direction in which they are already magnetized or tends to demagnetize them. The net contribution of extraneous signals forms a noise pulse which may have an amplitude comparable with that of the signal voltage.

A sensing method which avoids the aforementioned difficulties is described by Jan A. Rajchman, in an article entitled "A Myriabit Magnetic Core Matrix Memory," in the October 1953 issue of the Proceedings of the I.R.E., pages 1407–1421. In this method the two address wires have impressed upon them alternately positive and negative pulses. The output waveform due to extraneous noise pulses from the unselected cores will then be bipolar, having approximately as much area below as above the zero axis.

If initially the selected core is magnetized in one direction, a bipolar pulse will also be obtained from the selected core and will be impressed upon the sensing wire. If the core is magnetized in the opposite direction, however, only a unipolar output pulse will be obtained in response to two input pulses of alternately opposite polarity. Thus, a unipolar pulse will be obtained from the selected core in this latter condition. If the output voltage from the sensing wire is integrated over a complete cycle consisting of one bipolar input pulse, the noise contribution of each one of the cores will effectively be cancelled. Under the first named condition of the selected core the output pulse will therefore be zero. For the second named condition, however, an output pulse is obtained. By integrating the output voltages of a magnetic memory, therefore, a high degree of noise cancellation is possible.

This principle may be extended to other types of memory units such as magnetic drum memory and magnetic tape units. Integrators utilizing vacuum tubes have been used to perform these functions. These, however, involve the use of many vacuum tubes and are quite complex.

Accordingly, it is the primary object of this invention to provide a semiconductor integrator circuit having simple configuration, and a relatively high output voltage.

It is a further object of this invention to provide a semiconductor integrator circuit in which unipolar pulse information may be integrated.

It is a still further object of this invention to provide circuit means including a semiconductor device for the integration of bipolar signals.

These and further objects of this invention may be attained by applying a signal to a base region of an integrator transistor. Further in accordance with this invention, the emitter of this transistor is connected to a common point in the circuit through a load resistor. Interrogation pulses are applied between the collector and the common point. Output signals are derived from the emitter in response to the interrogation pulses and are proportional to the current-time integral of the input signal. A capacitor connected in parallel with the load resistor improves the waveform of the output signal by compensating for the collector junction capacity of the transistor. If the base input impedance is constant, the current-time integral is a measure of the total energy of the input waveform. A resistor having a large resistance relative to the base input impedance is connected in series with the base in order to provide the required constant input impedance.

The novel features that are considered characteristic of this invention are set forth with particularity in the appended claims. The invention itself, however, both as to its organization and method of operation as well as additional objects and advantages, thereof, will be best understood from the following description when read in connection with the accompanying drawing in which:

Figure 1 is a schematic circuit diagram of an integrator circuit provided in accordance with the present invention.

Figure 2 is a graph showing curves illustrating the output waveform under various conditions of input excitation.

Figure 3 is a graph showing curves illustrating the output response to various amounts of input signal energy, and Figure 4 is a block diagram of a magnetic memory system including a schematic circuit diagram of an integrator circuit, utilizing the present invention.

Referring now to the drawings and particularly to Figure 1, a transistor 10 of the type including a base region having substantially no electric field, the base region being connected to a base electrode 13, also includes a collector electrode 14 and an emitter electrode 12 separated from the base region by two similar junctions. One terminal of a generator of unipolar signals 18 is coupled to the base electrode 13 through one of a pair of input terminals 20 and a series linearizing resistor 16. The other terminal of the generator 18 is connected to a common point in the circuit through the other of the pair of input terminals 20. The emitter electrode 12 is coupled to the common point through the parallel combination of a capacitor 24 and a resistor 26. The resistor 26 serves as a load and the capacitor 24, connected in parallel with the load, is used to improve the waveform of the output signal. Output signals are derived from a pair of output terminals 28, one of which is connected to the emitter electrode 12 and the other of which is connected to the common point. Interrogation signals are applied between a pair of interrogation terminals 30, which in turn are connected between the collector electrode 14 and the common point.

The transistor in the illustration is shown to be of the P–N–P type. With this type of transistor the unipolar input generator 18 must supply negative pulses to the base electrode 13 upon application of a negative interrogation pulse. A negative output signal is derived at the output terminals 28. An N–P–N transistor may also be used, provided that the polarities of all the pulses are reversed.

In the operation of this circuit a negative pulse from the generator 18, applied to the base electrode 13 through the linearizing resistance 16, causes holes to be emitted across both the collector and emitter junctions. Because of the low diffusion constant of the holes, they will tend to remain in the base region for a period of time and will deffuse to the collector and emitter regions relatively slowly and in an exponential fashion. During the period of time in which the holes remain in the base region, the total impedance from the collector to emitter will be relatively small. Negative voltage pulses applied to the collector electrode through the interrogation terminals 30 will cause a pulse of current to flow into the emitter electrode, thereby causing a negative voltage pulse to appear at the emitter electrode, and across the output terminals. If the interrogation pulse is of standard width or of predetermined time duration which is constant, then the amplitude of the emitter voltage pulse will be a direct measure of the resistivity of the base region which in turn is a direct measure of the number of holes injected into this region, across the emitter and collector junctions. This number of holes is determined by the charge injected into the base region by the input signal current.

The density of positive charge or holes in the base region is a direct function of the instantaneous current-time product of the input signal. By use of a linearizing resistance 16, the hole density is also a direct function of the instantaneous voltage-time product of the input signal. The output pulse from this circuit in response to an interrogation pulse will have an amplitude, therefore, which is proportional to the total energy of the input signal.

The interrogation pulse, in addition to providing the standard output, also clears the base region of any charge, so that the transistor is in condition to receive the next input pulse. The circuit is thus capable of rapid recovery upon application of the interrogation pulse, as opposed to the aforementioned integrator circuit utilizing the combination of a resistor and a capacitor in which the capacitor requires time for discharge.

Referring now to Figure 2, the curve 32 shows the output which is obtained upon the application of no input signal. The amplitude of this voltage pulse represents a fixed constant of integration. The curve 34 represents a finite input signal and the curve 36 represents the output signal which is derived upon the application of the input signal 34. The curve 38 shows an input signal of the same amplitude as the curve 34 but double the time duration or width. The output pulse 40 shows the output amplitude which is obtained upon application of the input pulse 38. When the fixed constant of integration given by the curve 32 has been subtracted, the amplitude of the output pulse 40 is equal to double the amplitude of the curve 36 after subtraction of the integration constant from it. The curve 44 shows the output waveform which is obtained when the input pulse width is quadrupled as shown in curve 42.

The sensitivity of this current to amplitude changes in the input is shown in the curves 46 and 48 for the input and output pulse respectively. The curve 46 is adjusted to have half the width and double the amplitude of the curve 42. The output pulse signal as shown by the output curve 48, however, is identical in size with the output curve 44. The curve 50 shows input pulse for an amplitude four times and a quarter the width of the curve 42. The output pulse obtained in response to the input pulse 50 is shown in the curve 52 to be of the same amplitude as the output curve 44. Thus, doubling either the width or the amplitude of the input wave will increase the output amplitude by a factor of two after the fixed constant of integration has been properly accounted for. The response of this integrator circuit to both amplitude and time is quite linear.

Figure 3, to which reference is now made, illustrates by means of a curve 60 the linearity of the relationship between the output voltage amplitude and the input energy which is expressed in volt-microseconds. The intersection of the curve 60 with the output voltage axis represents the fixed constant of integration which must be subtracted from the output. The sensitivity of the circuit may be expressed by the slope of the curve 60.

Reference is now made to Figure 4 in which a circuit embodying the present invention provides integration of bipolar information from a magnetic memory system.

Output signals from a magnetic memory system illustrated as a block 70 are coupled to an aplifier 72. The output of this amplifier is connected in driving relation through a coupling transformer 74 to a pair of semiconductor integrating circuits operating in push-pull. These integrating circuits are identical to that described in Figure 1 and are arranged to accept only unipolar information. Signals from the push-pull secondary winding of the transformer 74 are coupled through a pair of diodes 76 and 78 to a base electrode 80 and 82 of the pair of transistors 84 and 86. The pair of diodes 76 and 78 prevent any positive signals from being applied to the respective base electrodes 80 and 82. Thus, storage of charge occurs only in response to negative input signals. The push-pull connection causes one transistor to store charge proportional to amplifier output signals of one polarity while the other transistor will store charges proportional to amplifier output signals of the opposite polarity. Upon application of an interrogation pulse from any convenient generator 88 to the collector electrodes 90 and 92, output signals are developed at the emitter electrodes 94 and 96 respectively. The parallel combination of the resistor 98 and capacitor 100, connected between the emitter electrode 94 and ground, and the parallel combination of the resistor 102 and capacitor 104, connected between emitter electrode 96 and ground, serve the same functions as the resistor 26 and the capacitor 24 of Figure 1.

Signal voltages from the emitter electrodes 94 and 96 are applied to the input terminals 106 and 108 respectively of a difference amplifier 110. The function of the difference amplifier 110 is to provide an output signal at a pair of output terminals 112 which is proportional to the difference between the signals at the two input terminals 106 and 108. This circuit, therefore, provides integration of bipolar signals, thereby allowing the use of various noise-cancelling magnetic memory readout methods.

A semiconductor integrator circuit in accordance with the present invention is thus seen to be eminently suitable for the integration of unipolar electrical transients, and with relative ease may be adapted to provide integration of bipolar information. The relationship between the output voltage amplitude and the input energy is remarkably linear over a wide range of input energy values.

What is claimed is:

1. A semiconductor integrator circuit comprising in combination, a semiconductor device including base emitter and collector electrodes and having a base region with which said base electrode is cooperatively associated and in which charge carriers may be stored for a predetermined period, input signal means connected serially between said base electrode and a point of substantially fixed reference potential for injecting an electric charge into said base region proportional to the amplitude and width of an input signal, a source of interrogation pulses of predetermined width connected serially between said collector electrode and said point of substantially fixed reference potential, a direct current conductive impedance element connected between said emitter electrode and said point of substantially fixed reference potential, and output circuit means coupled between said emitter electrode and said point of substantially fixed reference potential, whereby output signals of said predetermined width and having an amplitude which is proportional to said stored charge are developed across said impedance element in response to said interrogation pulses.

2. A semiconductor integrator circuit comprising in combination, a pair of semiconductor devices each including a base, emitter and collector electrodes, each further including a base region with which said base electrode is associated and in which electric charge carriers may be stored for a predetermined period, an input circuit for providing bipolar push-pull input signals to each of said base electrodes and including a unilaterally conducting device interposed serially with each of said base electrodes, a source of interrogation pulses connected between a point of substantially fixed reference potential and said collector electrodes coupled in common, a direct-current conductive impedance element connected between each of said emitter electrodes and said point of substantially fixed reference potential, and output means connected to each of said emitter electrodes and said point of substantially fixed reference potential for detecting the difference between the voltages appearing at each of said emitter electrodes, whereby said bipolar signals are integrated.

3. A semiconductor integrator circuit comprising in combination, a pair of semiconductor devices each including base, emitter and collector electrodes, each further including a base region with which said base electrode is associated and in which electric charge carriers may be stored for a predetermined period, each of said devices being arranged in one of a pair of parallel signal paths between an input circuit and an output circuit, interrogation means connected with each of said collector electrodes, a pair of direct-current conductive impedance elements connected serially between said emitter electrodes, a phase source connected wtih said input circuit for applying signal information between each of said base electrodes and the junction of said direct-current conductive impedance elements, and output circuit means coupled between said emitter electrodes, whereby output signals of predetermined width and of an amplitude determined by the algebraic sum of the voltages across said impedance elements are developed across said output circuit in response to interrogation signals.

References Cited in the file of this patent

UNITED STATES PATENTS

| | | |
|---|---|---|
| 2,561,817 | Parker | July 24, 1951 |
| 2,644,892 | Gehman | July 7, 1953 |
| 2,644,983 | Gehman | July 7, 1953 |
| 2,652,460 | Wallace | Sept. 15, 1953 |
| 2,760,087 | Felker | Aug. 21, 1956 |

OTHER REFERENCES

Publication: "Electronics," November 1953, pp. 166–172.